US00RE37258E

(19) United States
(12) Reissued Patent
Patel et al.

(10) Patent Number: US RE37,258 E
(45) Date of Reissued Patent: Jul. 3, 2001

(54) OBJECT ORIENTED PRINTING SYSTEM

(75) Inventors: Jayendra Natubhai Patel, Sunnyvale; Ryoji Watanabe, Cupertino; Mark Peek, Lomond; L. Bayles Holt, San Jose; Mahinda K. de Silva, Mountain View, all of CA (US)

(73) Assignee: Object Technology Licensing Corp., Cupertino, CA (US)

(21) Appl. No.: 09/173,465

(22) Filed: Oct. 14, 1998

Related U.S. Patent Documents

Reissue of:
(64) Patent No.: 5,566,278
Issued: Oct. 15, 1996
Appl. No.: 08/111,238
Filed: Aug. 24, 1993

(51) Int. Cl.[7] ..... G06F 15/00
(52) U.S. Cl. ..... 358/1.15; 358/1.13
(58) Field of Search ..... 358/1.13, 1.15, 358/1.18, 1.1, 1.16, 1.17; 345/433, 438; 710/1, 11, 14, 19, 24, 33, 34, 39, 50, 54, 72, 100, 104, 105, 106, 112, 129; 395/500.44

(56) References Cited

U.S. PATENT DOCUMENTS

| | | | | |
|---|---|---|---|---|
| 4,821,220 | * | 4/1989 | Duisberg | 364/578 |
| 4,885,717 | * | 12/1989 | Beck et al. | 364/900 |
| 4,891,630 | * | 1/1990 | Friedman et al. | 340/706 |
| 4,953,080 | * | 8/1990 | Dysart et al. | 364/200 |
| 5,025,398 | * | 6/1991 | Nelson | 395/112 |
| 5,025,399 | * | 6/1991 | Wendt et al. | 395/117 |
| 5,041,992 | * | 8/1991 | Cunningham et al. | 364/518 |
| 5,050,090 | * | 9/1991 | Golub et al. | 364/478 |
| 5,052,834 | * | 10/1991 | Feistel et al. | 400/121 |
| 5,060,276 | * | 10/1991 | Morris et al. | 382/8 |
| 5,075,848 | * | 12/1991 | Lai et al. | 395/425 |
| 5,093,914 | * | 3/1992 | Coplien et al. | 395/700 |
| 5,119,475 | * | 6/1992 | Smith et al. | 395/156 |
| 5,123,757 | * | 6/1992 | Nagaoka et al. | 395/114 |
| 5,125,091 | * | 6/1992 | Staas, Jr. et al. | 395/650 |
| 5,133,075 | * | 7/1992 | Risch | 395/800 |
| 5,136,705 | * | 8/1992 | Stubbs et al. | 395/575 |
| 5,151,987 | * | 9/1992 | Abraham et al. | 395/575 |
| 5,181,162 | * | 1/1993 | Smith et al. | 364/419 |
| 5,226,112 | * | 7/1993 | Mensing et al. | 395/114 |
| 5,287,194 | * | 2/1994 | Lobiondo | 395/114 |
| 5,303,336 | * | 4/1994 | Kageyama et al. | 395/114 |
| 5,323,393 | * | 6/1994 | Barrett et al. | 370/85.8 |
| 5,337,258 | * | 8/1994 | Dennis | 395/575 |
| 5,353,388 | * | 10/1994 | Motoyama | 395/117 |
| 5,495,561 | * | 2/1996 | Holt | 395/112 |

OTHER PUBLICATIONS

IBM Technical Disclosure Bulletin, V. 34(10A), New York, US, pp. 912–193 "Use of Agraphical User Interface for Printers" Mar. 1992 .*

* cited by examiner

*Primary Examiner*—Dov Popovici
(74) *Attorney, Agent, or Firm*—Morgan & Finnegan, LLP

(57) ABSTRACT

An object-oriented printing system includes objects that provide query, data transfer, and control methods. The inventive object-oriented printing system communicates with the remainder of the operating system by means of a standard interface such as a grafport and printer drivers are provided for each printer type within the operating system. Thus, an application not only need not worry about the particular printer/computer combination with which it is to operate, but also need not have a built in document formatting capability. The printing system includes objects that provide queries for device identification, optimized imaging, and printer status. Other objects are also provided for data transfer to bracket connections prior to sending and receiving information. Still other objects are provided for cancelling a print job, pausing a job, and clearing out a job. Finally, an object is also provided for supporting multiple streams of communication to an imaging task.

33 Claims, 12 Drawing Sheets

OBJECT ORIENTED PRINTING SYSTEM

Matter enclosed in heavy brackets [ ] appears in the original patent but forms no part of this reissue specification; matter printed in italics indicates the additions made by reissue.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office.

FIELD OF THE INVENTION

The invention generally relates to improvements in computer systems and, more particularly, to operating system software for printing documents.

BACKGROUND OF THE INVENTION

One of the most important aspects of a modern computer system is the ability to generate a "hard" copy of textual information or graphics which can be manipulated by the computer, visually displayed and stored. In order to accomplish this task, a computer system generally includes a printing device which is electrically connected to the computer system and controlled by it in order to generate a permanent image on a selected medium. Examples of printing devices in common use are dot matrix, ink jet and laser printers which fix permanent images on paper under control of the computer. Although paper is the most common medium, other media are often used, such as photographic film.

In order to print a document which is displayed on the monitor or stored, within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include the insertion of control commands into the printable information in order to control the printing device. These added commands may, for example, include such commands as carriage returns, line feeds, form feeds, spaces and font information, all of which format the printable information. The reformatting may also include a conversion step in which a graphical display is converted into the form used by the printing device.

The pagination and reformatting necessary to convert the printable information into a form which can be printed on a given printing device is generally performed by software programs running within the computer system. Software programs operating on a computing system generally can be categorized into two broad classes: operating systems which are usually specific to a type of computer system and consist of a collection of utility programs that enable the computer system to perform basic operations, such as storing and retrieving information on a peripheral disk memory, displaying information on an associated video display, performing rudimentary file operations including the creation, naming and renaming of files and, in some cases, performing diagnostic operations in order to discover or recover from malfunctions.

By itself, the operating system generally provides only very basic functions and must be accompanied by an "application" program. The application program interacts with the operating system to provide much higher level functionality and a direct interface with the user. During the interaction between the application program and the operating system, the application program typically makes use of operating system functions by sending a series of task commands to the operating system which then performs the requested tasks. For example, the application program may request that the operating system store particular information on the computer disk memory or display information on the video display.

FIG. 1 is a schematic illustration of a typical computer system utilizing both an application program and an operating system. The computer system is schematically represented by dotted box 100, the application program is represented by box 102 and the operating system by box 106. The interaction between the application program 102 and the operating system 106 is illustrated schematically by arrow 104. This dual program system is used on many types of computers systems ranging from mainframes to personal computers.

The method for handling printing, however, varies from computer to computer, and, in this regard, FIG. 1 represents a prior art personal computer system. In order to provide printing functions, the application program 102 interacts (as shown schematically by arrow 108) with printer driver software 110. Printer driver software 110 is generally associated with an application program and reformats and converts the printable information as necessary. Since each printer has its own particular format and control command set, which must be embedded in the text properly to control the printer, the printer driver software 110 must be specifically designed to operate with one printer or one type of printer.

The printer driver software 110 produces a reformatted information stream containing the embedded commands as shown schematically as arrow 114. The converted information stream is, in turn, applied to a printer port 112 which contains circuitry that converts the incoming information stream into electrical signals. The signals are, in turn, sent over a cable 116 to the printer 118. Printer 118 usually contains an "imaging engine" which is a hardware device or a ROM-programmed computer which takes the incoming information stream and converts it into the electrical signals necessary to drive the actual printing elements. The result is a "hard copy" output on the selected medium.

While the configuration shown in FIG. 1 generally works in a satisfactory manner, it has several drawbacks. Since the printer driver software 110 is specific to each type of printer, a separate driver had to be provided for each printer type with which the application program is to operate. In the personal computer market, there are a large number of different printer types that are compatible with each type of computer and, therefore, as the number of printer types proliferated, so did the number of printer drivers which were required for each application program so that the program was compatible with most available printers. Therefore, application program developers had to provide larger and larger numbers of printer drivers with each application program, resulting in wasted time and effort and wasted disk space to hold the drivers, only one or two of which were of interest to any particular user. Unfortunately, if a user purchased an application program and it did not include a printer driver which could control the printer which the user owned, unpredictable operation occurred, resulting in program returns and user dissatisfaction.

In addition, it was also necessary for each application program to provide high level printing functions such as pagination and page composition (including addition of margins, footnotes, figure numbers, etc.) if such functions were desired. Consequently, each application program developer had to spend time developing programs to implement common printing functions which programs were specific to each application program, thereby resulting in duplicated effort and wasted time.

In order to overcome the aforementioned difficulties, the prior art arrangement was modified as shown in FIG. 2. In this new arrangement, computer system 200 is still controlled by application program 202 which cooperates, as shown schematically by arrow 204, with operating system 206. However, in the system shown in FIG. 2 operating system 206 includes printer drivers 214. A separate printer driver must still be provided for each different type of printer, but the printer drivers are sold with, and part of, the operating system. Consequently, it is not necessary for each application program to have its own set of printer drivers. An application program, such as application program 202, communicates with the printer driver 214 by means of a standardized interface 210. Two common interfaces are called "grafports" or "device contexts". Illustratively, application program 202 provides information (shown schematically shown by arrow 208) in a standardized form to the grafport 210. The grafport 210, in turn, forwards information, as shown by arrow 212, to printer driver 214 which reformats and converts the information as previously described into the format required by the printer. The output of printer driver 214 is provided (illustratively shown as arrow 216) to printer port 218 where it is converted to electrical signals that are transmitted, via cable 220, to the printer 222.

The configuration shown in FIG. 2 has the advantage that the application program developer need not worry about the specific computer and printer combination on which the program will ultimately run in order to provide printing capabilities to the application program. However, it still suffers from the drawback that, if desired, high level printing capabilities such as pagination and page composition must still be designed into each application program, thereby duplicating program code and wasting programming resources.

SUMMARY OF THE INVENTION

The foregoing problems are overcome and the foregoing object is achieved in an illustrative embodiment of the invention in which an object-oriented printing interface includes document grouping or folio objects which, once instantiated provide complete and flexible printing capability that is transparent to the application program. The printing interface objects include objects that provide query, data transfer, and control methods.

The inventive object-oriented printing interface communicates with the remainder of the operating system by means of a standard interface such as a grafport and printer drivers are provided for each printer type within the operating system. Thus, an application not only need not worry about the particular printer/computer combination with which it is to operate, but also need not have a built in document formatting capability. The printing system includes objects that provide queries for device identification, optimized imaging, and printer status. Other objects are also provided for data transfer to bracket connections prior to sending and receiving information. Still other objects are provided for canceling a print job, pausing a job, and clearing out a job. Finally, an object is also provided for supporting multiple streams of communication to an imaging task.

BRIEF DESCRIPTION OF THE DRAWINGS

The above and further advantages of the invention may be better understood by referring to the following description in conjunction with the accompanying drawings, in which.

DETAILED DESCRIPTION OF THE ILLUSTRATIVE EMBODIMENTS

Figure 1:
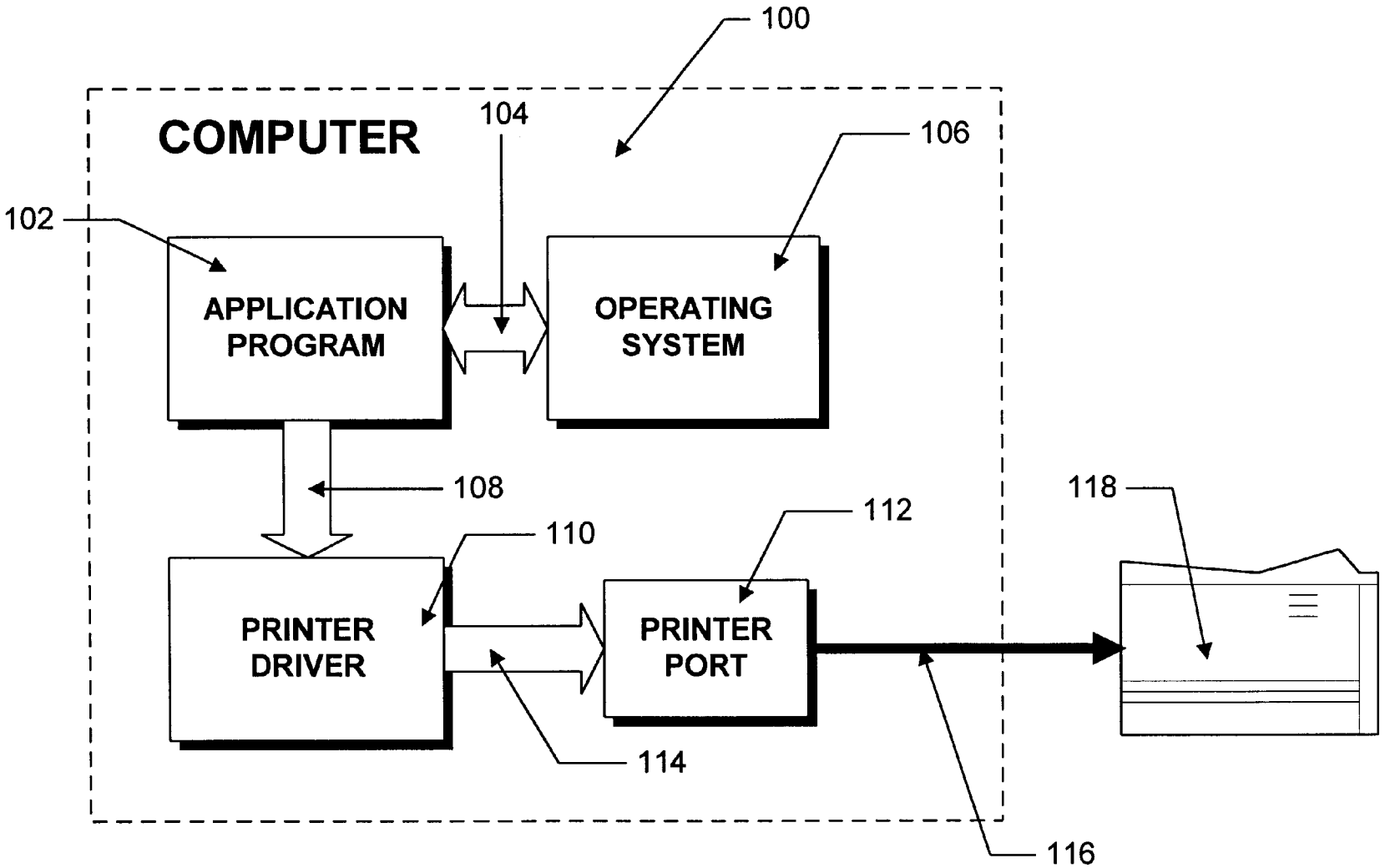
FIG. 1 (PRIOR ART)
FIG. 1 is a schematic block diagram of a prior art computer system showing the relationship of the application program to the operating system and the printer driver in the prior art.
Figure 2:
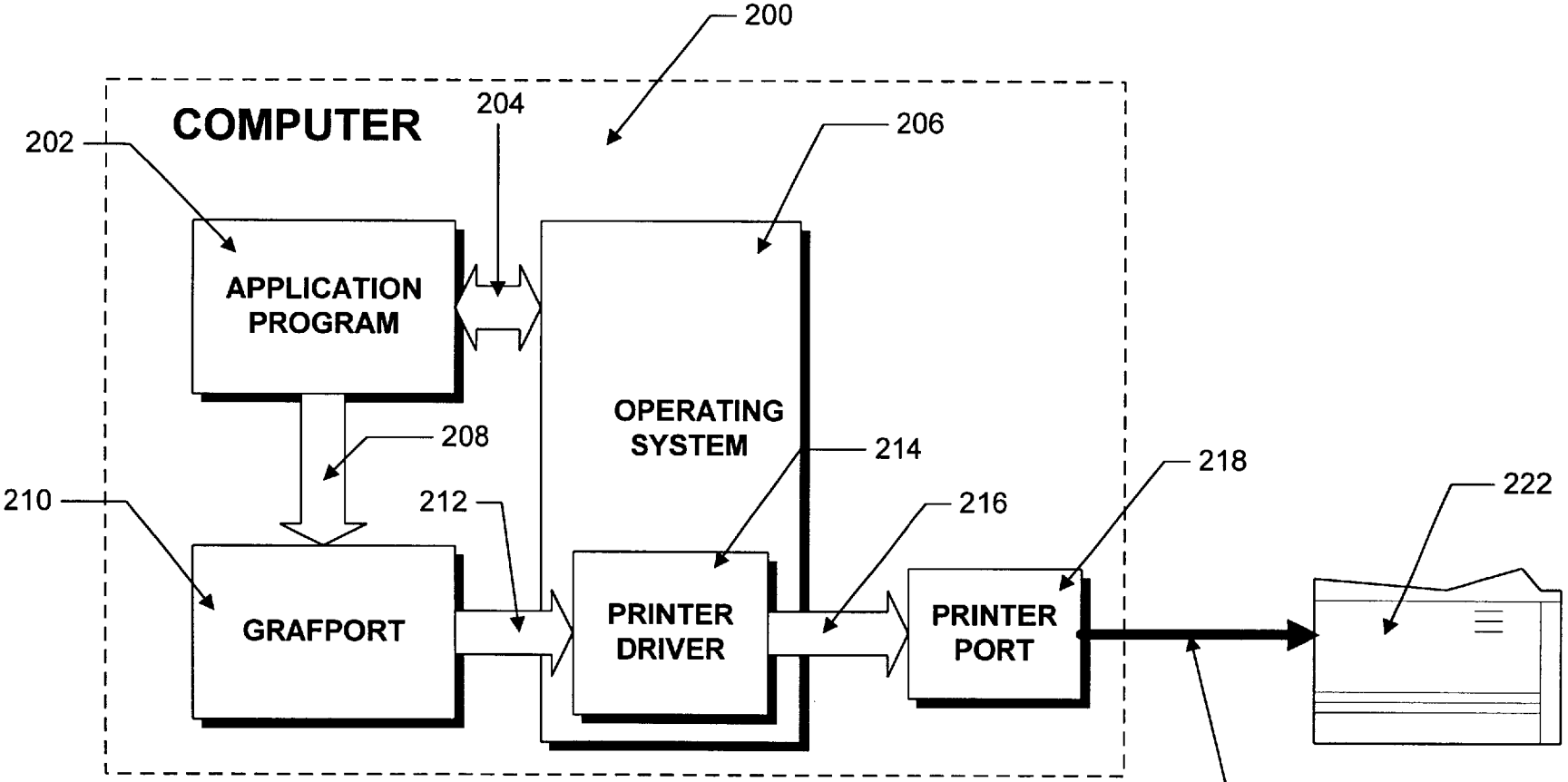
FIG. 2 (PRIOR ART)
FIG. 2 is a schematic block diagram of a modification of the prior art system shown in FIG. 1 to allow the application program to interface to a standard printing interface in the prior art.
Figure 3:
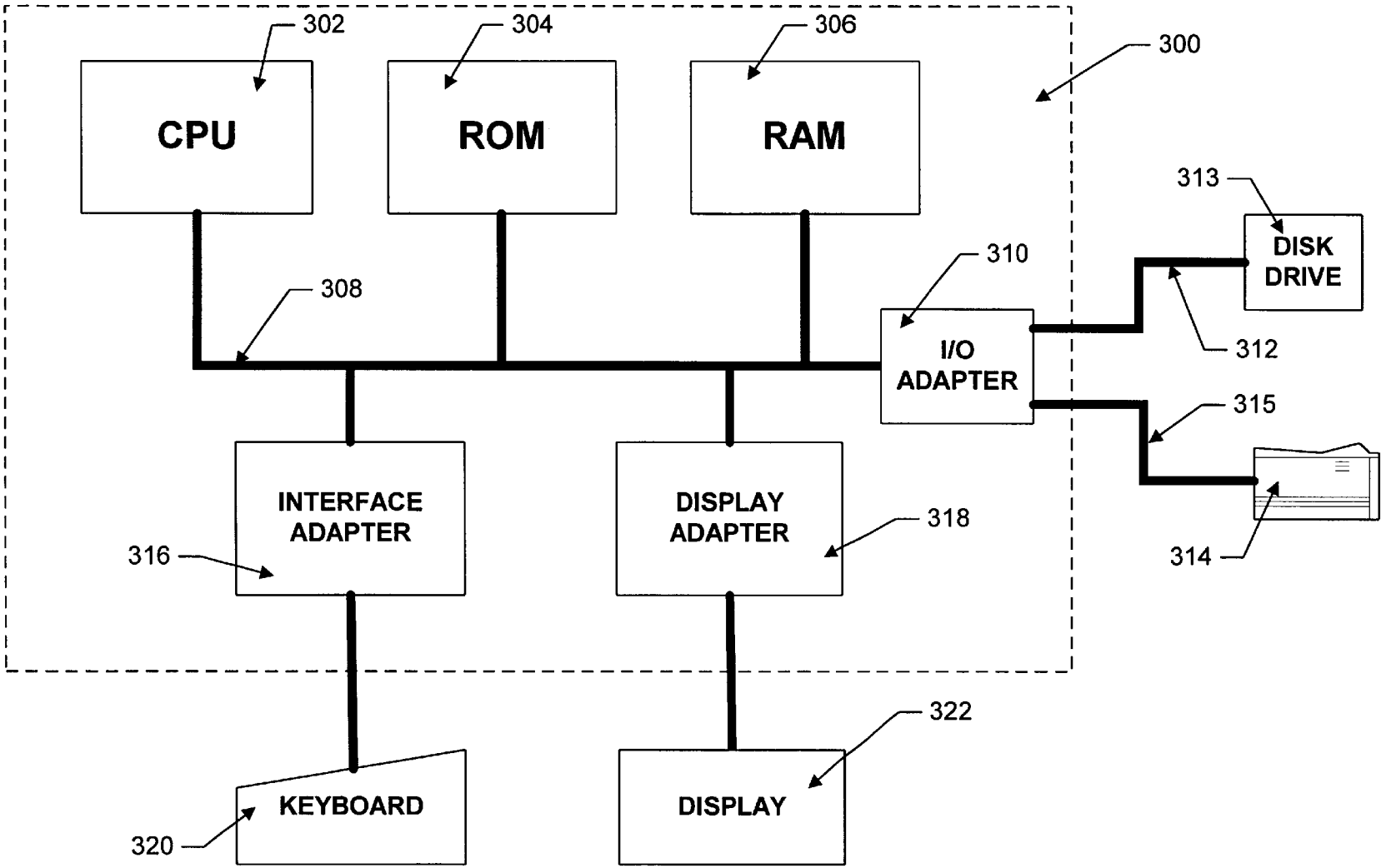
FIG. 3 is a block schematic diagram of a computer system, for example, a personal computer system on which the inventive object-oriented printing interface operates in accordance with a preferred embodiment.

The invention is preferably practiced in the context of an operating system resident on a personal computer such as the IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302, which may be a conventional microprocessor; a number of other units, all interconnected via a system bus 308, are provided to accomplish specific tasks. Although a particular computer may only have some of the units illustrated in FIG. 3 or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322 such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables cause the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of predefined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solution in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a printing framework which could provide the foundation for automated pagination, pre-print processing and page composition of printable information generated by an application program. An application software developer who needed these capabilities would ordinarily have to write specific routines to provide them. To do this with a framework, the developer only needs to supply the characteristics and behavior of the finished output, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 4:
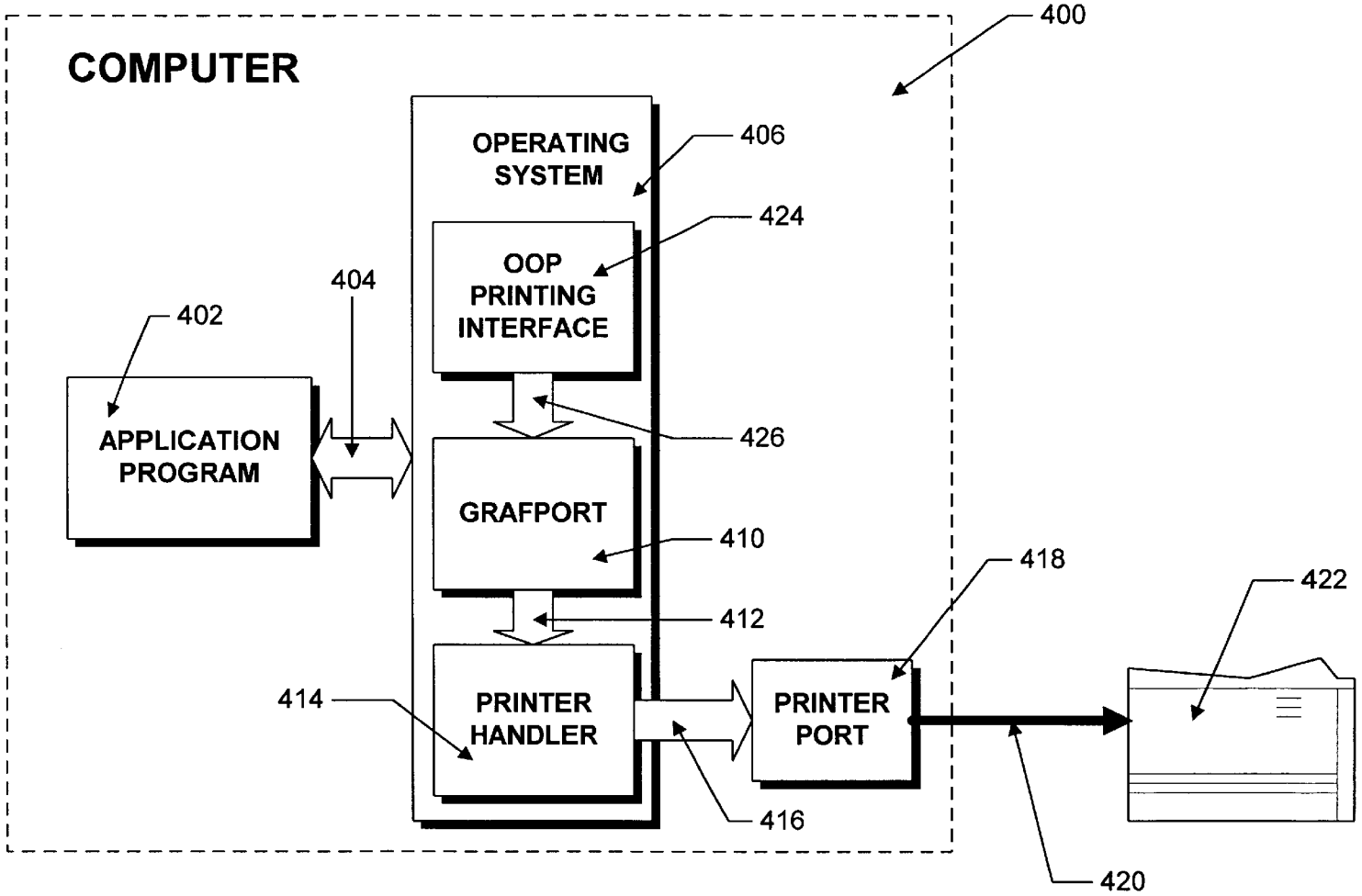
FIG. 4 is a schematic block diagram of modified computer system in which the operating system includes an inventive object-oriented printing interface in accordance with a preferred embodiment.

FIG. 4 shows a schematic overview of an computer system utilizing the object-oriented printing interface of the present invention. The computer system is shown generally as a dotted box 400, and an application program 402 and an operating system 406 are provided to control and coordinate the operations of the computer. Application program 402 communicates with operating system 406 as indicated by arrow 404. However, in accordance with an embodiment of the invention, rather than communicating directly with a standard interface, such as grafport 410, application program 402 can now communicate with operating system 406 at a higher level when it wishes to print information. This latter interaction is accomplished by providing an object-oriented printing interface shown schematically as box 424. As will hereinafter be described in detail, printing interface 424 responds to a series of simple commands generated by application program 402 in order to perform various formatting and pagination functions. The formatted, printable information is then transmitted to a grafport 410 as indicated schematically by arrow 426. It is possible for application program 402 to communicate directly with grafport 410 as in the prior art arrangement, however, it is not contemplated that most applications will do this unless special procedures are needed.

In any case, the information flows through grafport 410, and as indicated by arrow 412, is provided to a printer handler 414. Printer handler 414 is similar to printer drivers previously described. However, it is "intelligent" and offers some additionally capabilities which will be described herein. Essentially, printer handler 414 processes the incoming data stream indicated by arrow 412 and adds the necessary printer commands to control the associated printer schematically illustrated as printer 422. The reformatted data is provided, as indicated by arrow 416, to a printer port 418 which converts the data into electrical signals that are sent over cable 420 to printer 422.

Figure 5:
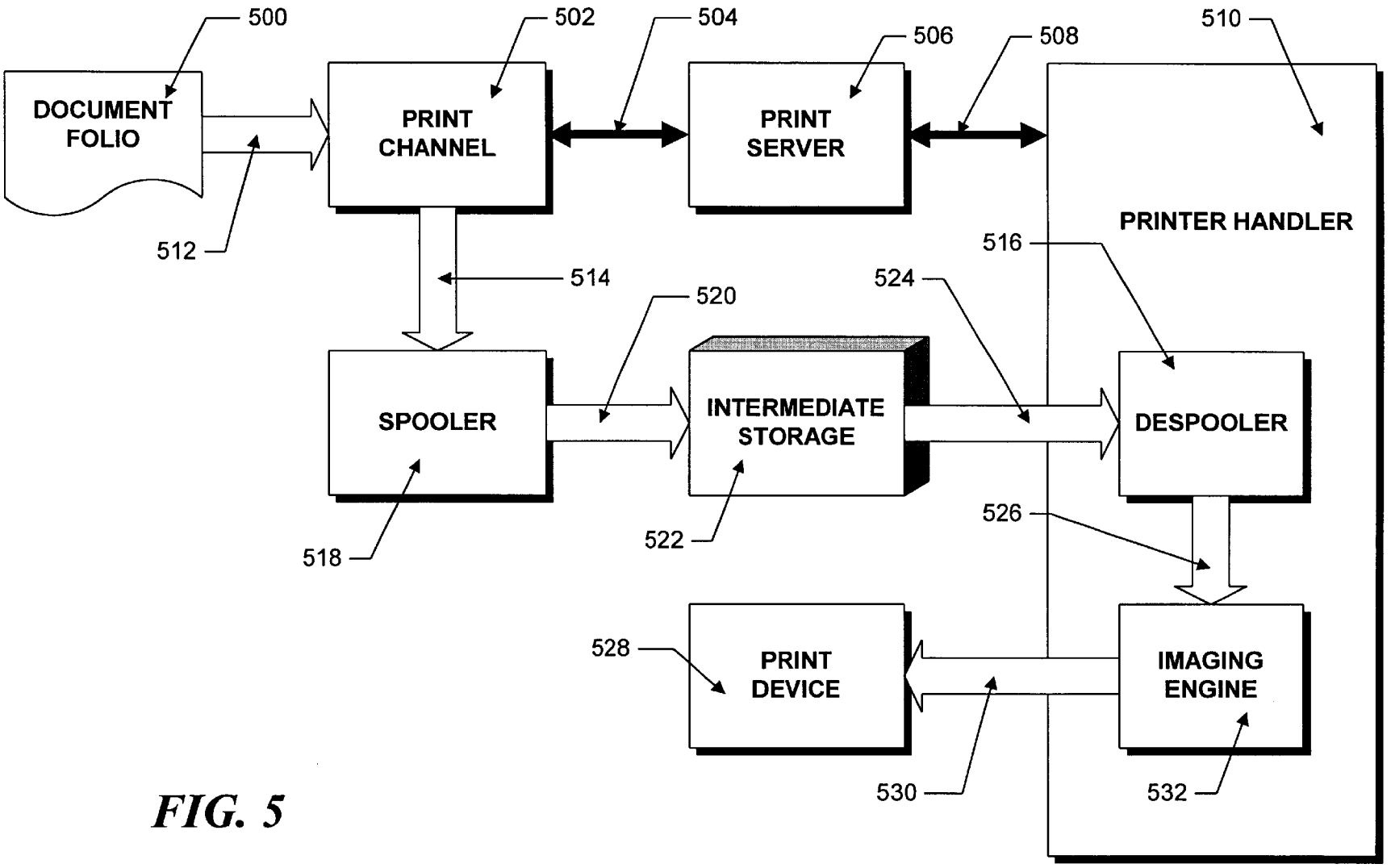
FIG. 5 is a block schematic diagram of the information paths and hardware by which printable information is channeled through intermediate storage to a print device in accordance with a preferred embodiment.

The actual mechanism by which a document generated by the printing interface 424 is transmitted to printer 422 is shown in more detail in FIG. 5. In particular, printing interface 424 (as will hereafter be described in detail) generates an entity called a document folio shown schematically as document folio 500 in FIG. 5. The document folio may consist of text, graphics or a combination of the two, all formatted and arranged in a manner specified by the application program. The document folio information is provided, as indicated by arrow 512, to a print channel 502. Print channel 502 is an object which is created to transport the information to an appropriate printer. Print channel uses a print job description and a printer identification provided by the application program to transmit the printable information to the appropriate printer.

More specifically, after the print channel 502 receives a printing job, it transmits the printable information to a spooler program 518 as indicated by arrow 514. Spooler 518 receives the incoming information stream and stores it, in incoming order, in an intermediate storage location 522 as indicated by arrow 520. Print channel 502 then sends a notification to a print server program 506 via a link 504, which notification informs print server program 506 that a new print job exists. The print server program 506 is standard program which monitors all print jobs that have been created and also checks the available printers to determine their status.

Once a print job has been completely spooled or stored in intermediate storage 522, the print server 506 notifies a printer handler 510 by means of a link 508. The printer handler 510 is type of printer driver which controls and drives a specific printer; its purpose is to convert text and graphic information into printer readable form for any particular printer type. Typically, a printer handler can only process one print job and any other jobs that are created and directed towards the associated printer are queued for later processing. The printer handler contains a despooler program (indicated as box 516) which retrieves the spooler data from intermediate storage 522 (as indicated by arrow 524)

and provides the information, as indicated by arrow 526, to an imaging engine schematically illustrated as box 532. The imaging engine 532 converts the incoming data stream into the command signals which are necessary to drive the printing elements to produce the final printed document. The commands, indicated schematically by arrow 430, are provided to the actual print device indicated by box 528 for printing.

Once a print job is completely printed, the printer handler 510 checks its queue for another print job and, if a job is present, begins processing it. Alternatively, if there are no new print jobs to process, the printer handler becomes inactive. After a particular print job is completed, the information stored in intermediate storage in 522 is deleted and the storage is reclaimed. As an option, the storage can retained until a user explicitly deletes the storage.

The printer handler framework facilitates creation of frameworks for different types of printers like PostScript, raster, vector, and PCL. A preferred embodiment provides a framework that is extensible so that new printers can be added to the system very easily. This includes printers with new imaging models, communication protocols, etc. The preferred embodiment also provides a framework that does most of the work to support a printer and at the same time provides enough flexibility for developer customization. The preferred embodiment also allows developer customization at various times during the printing process. Customization occurs at the desktop printer level for presenting device specific user interface, at print time for setting print time features (like duplex printing, multi-bin paper feeding, etc.), at imaging time, by providing a way to access the device at the beginning/end of document and page, and by providing a way to customize rendering of graphics model primitives. Finally, at the device level to support different communication protocol(s).

Clients

All printer manufacturers are clients of the printer handler framework. A client that uses a framework to design PostScript, raster, vector, and PCL printer handler frameworks. Developers start from one of these special types of frameworks and customize it for their printers. For example, a PostScript printer developer (like QMS or Linotype) would use the PostScript printer framework, a plotter developer (like CalComp) would customize the vector printer handler framework.

Architecture

The desktop printer is the only user visible part of the printer. All user actions (commands) related to the printer are handled by this object. When a document is to be printed, it is dragged to the printer icon (or the Print item is selected from the system wide menu). This starts the printing process by first spooling the document by packaging it as a print job. Spooling is a process of streaming the graphic description of a document to the disk so it can be imaged later (possibly in a different task) to the actual printing device represented by the desktop printer. The spooled print job is stored in the printer's persistent data which consists mainly of the print job queue and the printer's dynamic configuration. After the print job is spooled, the printer handler is sent a message that there is a print job for it to process. The printer handler picks up the print job, despools it, converts it to the printer's native imaging model and sends it to the printer.

User's Model of Printing

A reference to a printer in a preferred embodiment really mean a printer model and its associated files, which includes the printer handler. A model is a class that is subclassed from an existing class. Since all user visible entities on a system are models, or the interface presented by them, it makes sense to talk about a printer this way. Each printer model keeps its persistent data (job queue, configuration, etc.) in its model store. The model store provides a way for a model to create separate files that it alone manages. It has protocol for interfacing to a file system. The printer "component" has certain dependencies that must be satisfied when it is moved between machines or enclosed in a business card. A printer is typically dependent on its personality document, the shared library and archive for the system classes that implement the printer, and the shared library and archive for the developer supplied customizations.

When a user "installs" a printer handler in the system, it is immediately available for direct connect devices or in the network browser for network devices. This processing is facilitated by creating a physical model for a direct connect device and a service adapter is "registered" for a network device. A physical device object represents a real device that can be connected directly to the computer (as opposed to available on the network). It is capable of creating a subclass that represents the device. A service adapter indicates the directory protocols (AppleTalk Name Binding Protocol-(NBP), Domain Naming System(DNS) etc.) and service identifiers ("LaserWriter") it can handle and is called on by a directory service to create a model for a service available on a physical directory. To print to a direct connect device, a user connects the printer to the computer (for serial devices) and then drags a document to it. To print to a network device, either the document is dragged to the printer in the network browser or the printer is dragged to the desktop and then the document is dragged to it.

Printer Personality Document

Figure 6:
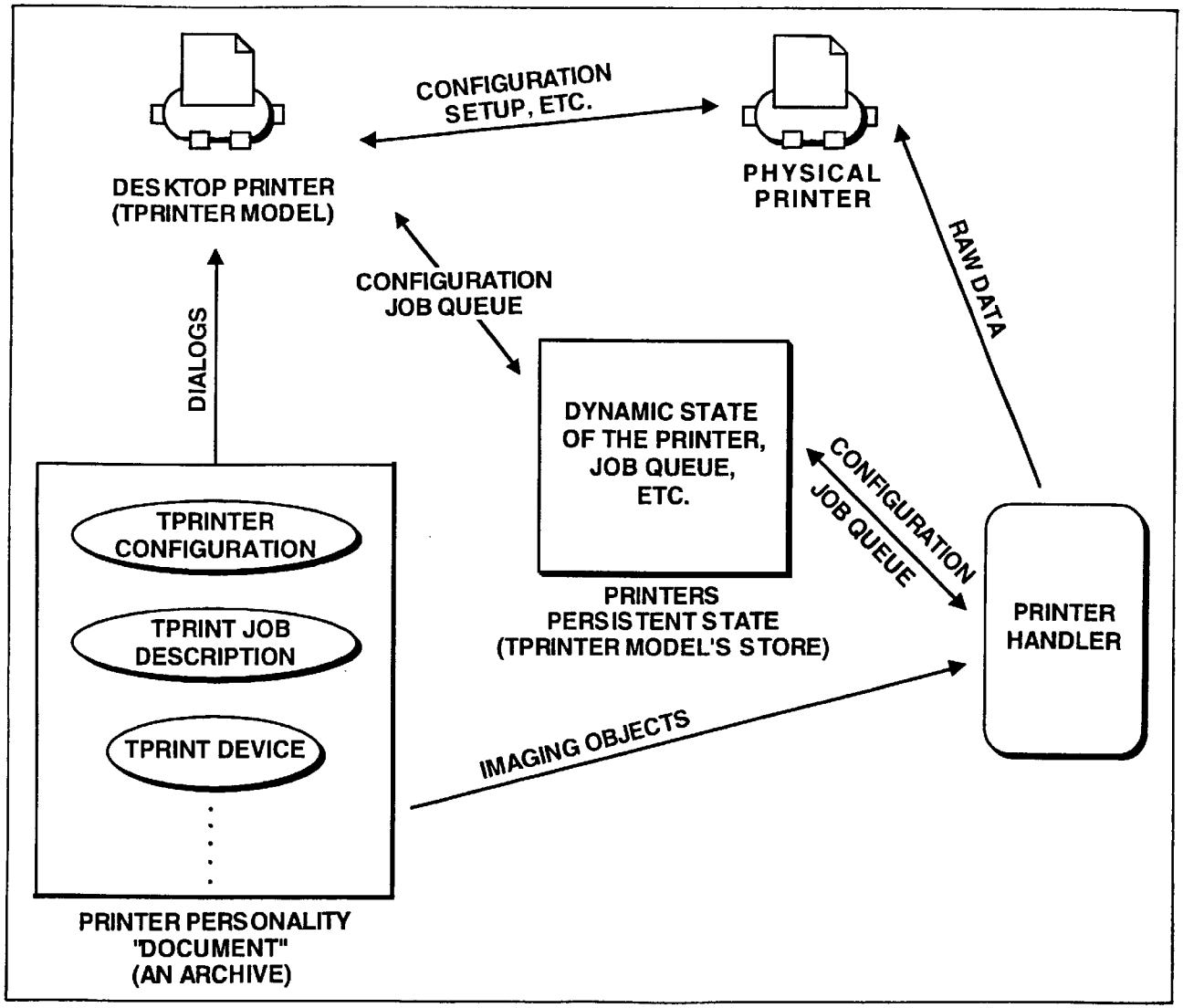
FIG. 6 shows how the personality document is used by different parts of the printing system in accordance with a preferred embodiment.

A personality document is supplied by the device manufacturer. The printer personality "document" contains instances of objects, just the data, that implement a particular printer. In other words, it is a shared library without code—just the archive. Examples of objects in the personality document are the printer configuration, print job description which specifies the print time options available on the printer, and the print device object that converts the graphic data into the printer's imaging model. FIG. 6 shows how the personality document is used by different parts of the printing system. The personality document supplied by the developer is used in read-only mode by the printing system. The desktop printer and the printer handler "read" this document to access its personality objects polymorphically.

The analogy of a printer model and its personality to an application and its document implies that a printer model can "read" many personality documents. However, in most cases there is only one personality document per printer because a printer model represents one physical printer. In the case where the user has more than one printer of the same type (for example, two LaserWriter IIg printers), one personality document may be "shared" by multiple printers. The desktop printer obtains user interface objects from the personality (the objects that present the user with printer configuration, features and settings that can be manipulated). The printer handler gets imaging objects from the personality and calls on them to reproduce the document on the printer. Once the printer's dynamic state is added to its persistent store, both the desktop printer and the printer handler refer to it for the printer's configuration. A personality document is created for each type of printer that a printer handler is created for. The document is created and given to the developer of that type of printer. The developer can "edit" the instance data of objects or replace them with the printer specific implementations.

Printer Handler

Figure 7:
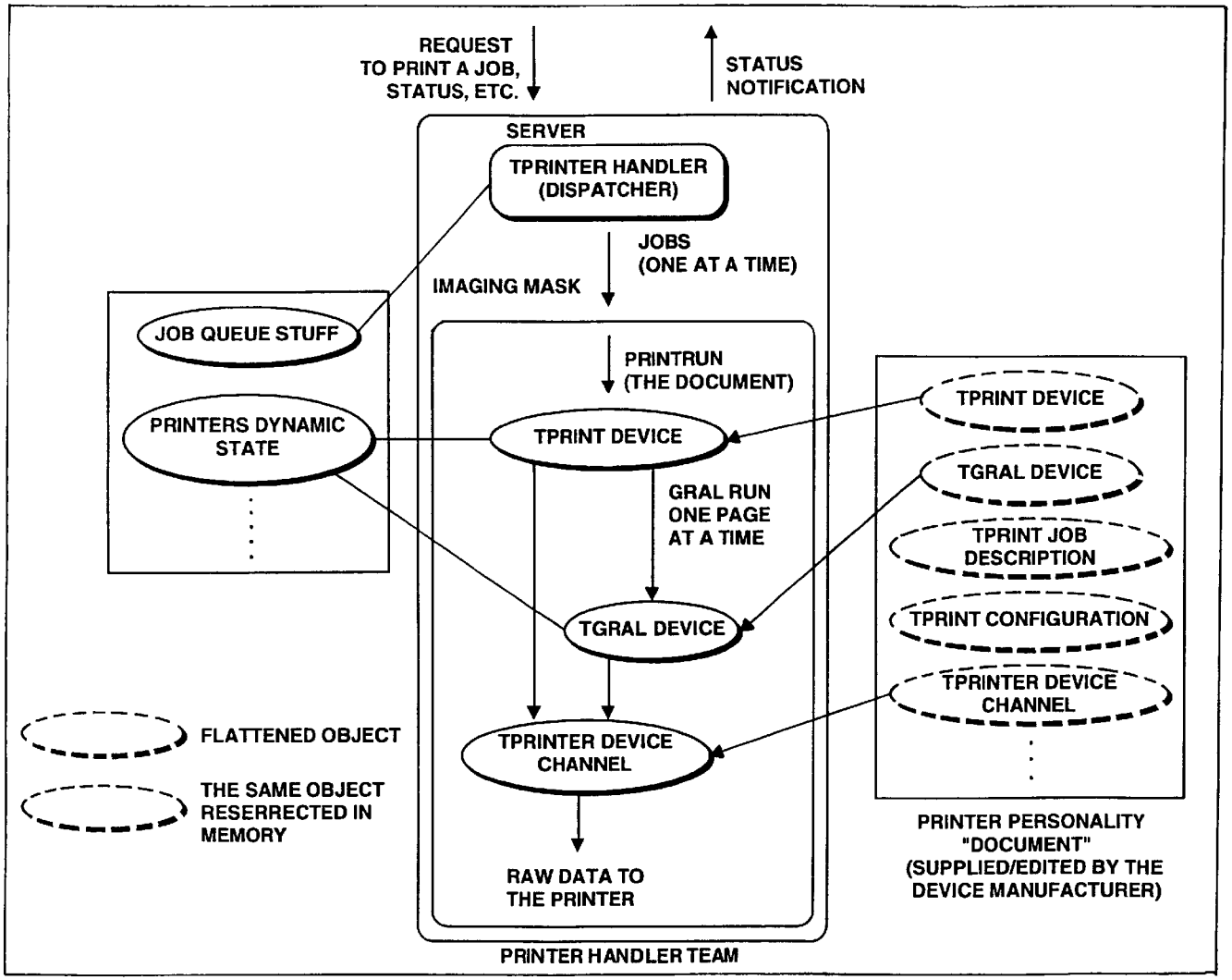
FIG. 7 details the printer handler components and their interactions in accordance with a preferred embodiment.
Figure 8:
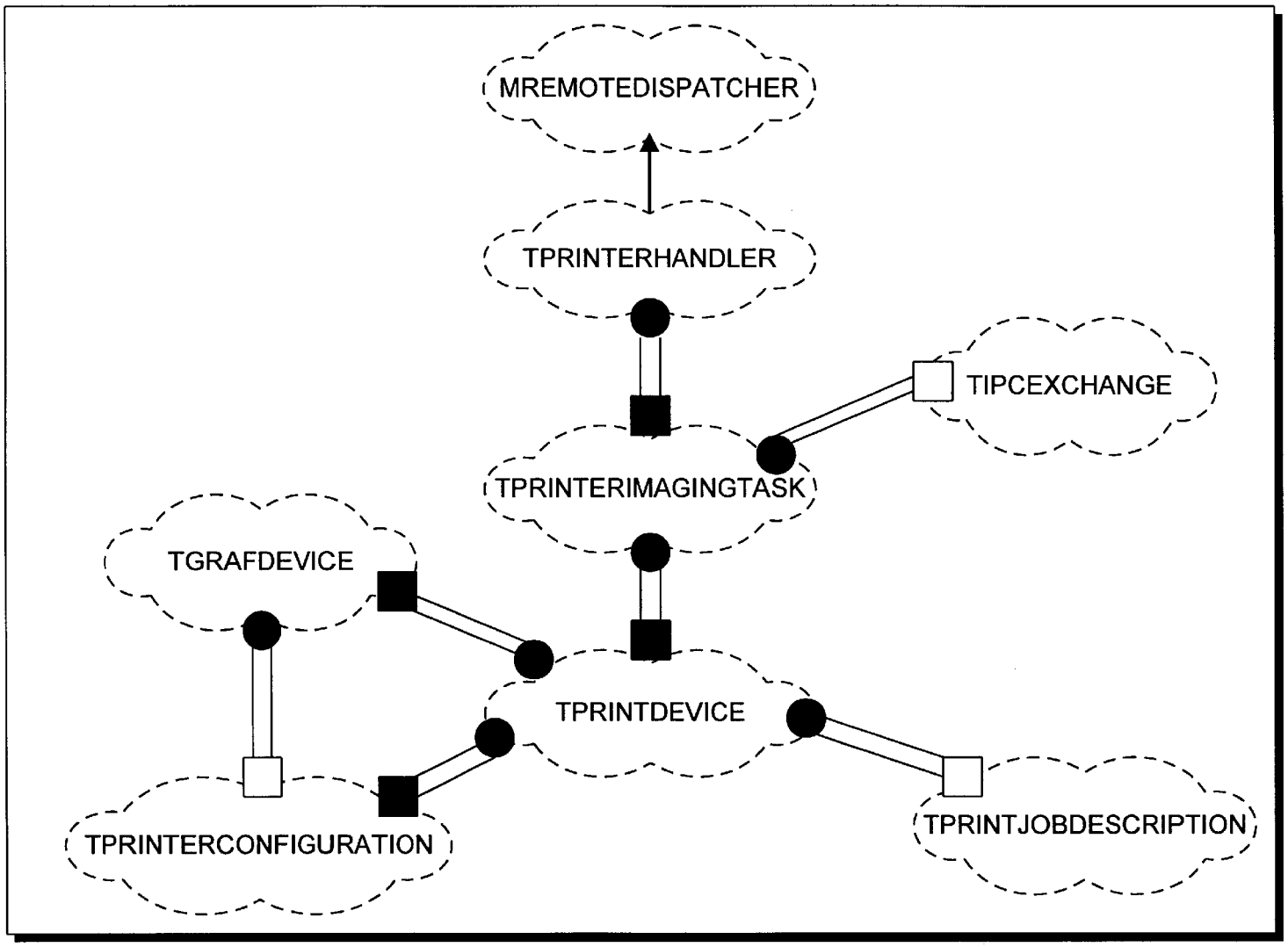
FIG. 8 illustrates the relationship between various printer handler classes in accordance with a preferred embodiment.

FIG. 7 details the printer handler components and their interactions in accordance with a preferred embodiment and FIG. 8 illustrates the logical relationship between various printer handler classes in accordance with a preferred embodiment. The printer handler server team is started by the desktop printer when a print command is initiated by either dragging the document to it or selecting the Print command from one of the menus. The printer handler program creates a dispatch giving it a dispatcher and a message stream to be used as a transport between the client and the server. The dispatch task combines the transport and the dispatcher to create the printer handler server.

There is one printer handler task per physical printer. The printer handler consists of a dispatcher and an imaging task. The dispatcher is a task that handles requests to print jobs and sends them to the imaging task so that the server task is free to handle other requests (more print jobs, status queries, notification, etc.). The printer handler architecture allows for more than one task working on print jobs. Instead of having only one imaging task, the printer handler dispatcher can have a pool of tasks that access the job queue and pick up a job to process. This way, the printer handler can be processing multiple jobs at the same time. If the target printer can accept only one job at a time, only one imaging task will be talking to it at a given time. The multiple imaging tasks model works well when the destination is a spooler that can accept more than one job at a time. Each job in the queue will know the task that is processing it so things like abort, pause, etc. can function properly.

Printer Handler Server

The printer handler task is started by the desktop printer when a print command is initiated by either dragging the document to the printer icon or selecting the Print command from one of the menus. The desktop printer has a client class that starts up the server. The client class provides the protocol for calling "remote" procedures that are implemented in other objects, tasks, or servers. The printer handler program creates a transport and a dispatcher to create the printer handler server.

There is one printer handler task per physical printer. The printer handler consists of a dispatcher and an imaging task. The dispatcher handles requests to print jobs and sends them to the imaging task so that the server task is free to handle other requests (more print jobs, status queries, notification, etc.). The printer handler architecture allows for more than one task working on print jobs. Instead of having one imaging task, the printer handler dispatcher has a pool of tasks that access the job queue and pick a job to process. This way, the printer handler can be processing multiple jobs at the same time. If the target printer can accept only one job at a time, only one imaging task communicates to it at a given time. The multiple imaging tasks function efficiently when the destination is a spooler that can accept more than one job at a time. Each job in the queue understands the task that is processing it so things like abort, pause, etc. are managed properly.

Printer Handler Imaging Task

The printer handler imaging task receives one job at a time. It uses the developer customizable imaging objects to convert the source description of the document into a stream of data targeted for a particular printer. The imaging task obtains a spool stream from the print job and passes it to the a printer device object. The printer device object extracts individual pages out of the print run and converts the individual pages into the printer's imaging model. The imaging objects also perform the task of mapping the attributes requested by the print job (page size, media, color, fonts, etc.) to features actually available on the printer. This processing is achieved by consulting the printer's dynamic state maintained by the printer handler.

The imaging objects produce an output stream that is sent to the output device. The framework for a specific type of printer defines an appropriate class. For example, the PostScript printer handler framework defines a class whose subclass talks with a printer using the AppleTalk Printer Access Protocol (PAP). A TCP/IP based printer can be easily supported by subclassing the same class.

Printer's Persistent Data

The printer handler is responsible for keeping track of the printer's persistent data, in particular, its job queue and dynamic state. The dynamic state contains things like the current media/tray setting, current color mode (2, 3 or 4 colors), etc. Since each printer would want to save different things in its dynamic state, there is a class that developers can subclass to add printer specific features. For the most part, it is this class that will be streamed out to the printer's persistent data store. The default implementation of the persistent data store will be a dictionary, although the developer is free to use some other storage scheme. Since the printer's state is persistent, the printer handler can be easily restarted in case of a crash or system shutdown.

The printer state, which is part of the printer model's store, is updated when the printer handler images a job to it and finds that the state has changed. This scheme works when the printer handler has two-way communication available with the printer. In cases when two-way communication is not available, the printer handler will rely on the printer's static configuration.

Status Reporting

One of the goals of the printer handler framework is to provide a convenient way for developers to report status and notification from the printer to the user. The printer handler framework employs the same facilities provided by standard frameworks. It is standard procedure to report normal progress information to the user as a print job progresses. There are two types of statuses that a printer handler might want to report. The first is the global status of the job, for example, "Processing page 3 of 50", or "Printing 4th out of 10 copies", etc. This type of global job status is common for all printers and can be provided easily by the framework. The second kind of status is one that comes directly from the printer, for example, "user: Jay Patel; job: Printer Handler ERS; status: busy; source: AppleTalk". Some printers may not report this type of status at all.

User notification is given in cases where there is a problem with printing. This may be a result of a printer out of paper, a paper jam, communication error, PostScript error, a plotter needs new/different set of pens, printer is out of ribbon, etc. For some of these situations, the user must be notified and the printing process can continue once the problem is rectified. There are cases, however, where the printer may not be able to say that the problem is fixed. In such cases, a notification must be given to the user and the printing process must wait until the user says it's OK to continue.

Printer Handler Classes

A discussion of the classes that implement the printer handler framework is provided below.

TPrinterHandler

```
class TPrinterHandler : public MRemoteDispatcher {
    public:
        TPrinterHandlero( );
        virtual-TPrinterHandler( );
    private:
    // Server Requests
    // Every XXXRequest method unflattens arguments, if any, and then
    // calls the corresponding HandleXXX method. It then calls
    // ReturnSuccess and flattens results to the result stream.
        // Job Queue Management
        // Requests that apply to all jobs in the queue
            void        GetAllJobsRequest( );
            void        AbortAllJobsRequest( ):
            void        DeferAllJobsRequest( );
            void        UndeferAllJobsRequest( );
            void        DeferAllJobsUntilRequest( );
        // Requests that apply to one job in the queue
            void        AddJobRequest( );
        // RemoveJobRequest will abort the job if it is currently
being processed.
        // Otherwise, the job will be removed from the queue.
            void        RemoveJobRequest( );
            void        PauseJobRequest( );
            void        DeferJobRequest( );
            void        UndeferJobRequest( );
        // Update printer's state
            void        UpdateDynamicPrinterDataRequest( );
        // return status of a job
            void        GetStatusOfJobRequest( );
        //
        // Subclasses can override the following HandleXXX methods.
        // HandleXXX are called from the corresponding request
methods.
        //
        // Job Queue Management
        // Requests that apply to all jobs in the queue
        virtual void    HandleGetAllJobs( );
        virtual void    HandleAbortAllJobs( );
        virtual void    HandleDeferAllJobs( );
        virtual void    HandleUndeferAlljobs( );
        virtual void    HandleDeferAllJobsUntil( );
        // Requests that apply to one job in the queue
        virtual void    HandleAddJob( );
        // RemoveJobRequest will abort the job if it is currently
being processed.
        // Otherwise, the job will be removed from the queue.
        virtual void    HandleRemoveJob( );
        virtual void    HandlePauseJob( );
        virtual void    HandleDeferJob( );
        virtual void    HandleUndeferJob( );
        // Update printer's state
        virtual void
    HandleUpdateDynamicPrinterData( );
        // return status of a job
        virtual void    HandleGetStatusOfJob( );
        // for TPrinterHandlerCaller only
        typedef enum {
            kGetAllJobsRequest, kAbortAllJobsRequest,
kDeferAllJobsRequest,
            kUndeferAllJobsRequest, kDeferAllJObsUntilRequest,
            kAddJobRequest, kRemoveJobRequest, kPauseJobRequest,
            kDeferJobRequest, kUndeferJobRequest,
            kUpdateDynamicPrinterDataRequest,
            kGetStatueRequest
        };
        friend class TPrinterHandlerCaller; // so it can use enums
above.
    protected:
        // Get the imaging task to send jobs to
        virtual TPrinterImagingTask* GetImagingTask( );
        // Get the job queue for this printer
        virtual TDeque* GetPrintJobQueue( );
```

-continued

TPrinterHandler

```
        // . . . . . Methods to communicate with the imaging task
        // . . . . . .
};
```

TPrinterHiandler is a base class that provides protocol for dispatching server requests. The corresponding client class TPrinterHandlerCaller is described later. TPrinterHandler maintains a job queue for the printer. This queue is semaphore protected to allow concurrent access by the printer handler and an imaging task. GetImagingTask creates a TPrinterImagingTask giving it an exchange to communicate with (an exchange provides a place to send messages to and receive messages from). TPrinterImagingTask is given one job at a time to process (by AddJobRequest). When the job is finished, it notifies the printer handler so it can decide what to do with the job.

GetStatusOfJobRequest returns status of a job in the job queue. For the job being processed currently, the status reported is the "global" job status described earlier. There are two ways this could be implemented. One way is for the TPrintDevice subclass to post the status (perhaps a TText) periodically at a global location which the printer handler returns to the client in GetStatusRequest method. Another way is to implement a helper task to get status from the TPrintDevice subclass. For any other job (not currently being processed), the status that is returned might be the number of pages in the job (if that's appropriate), how far down the queue this job is, etc.

TPrinterHandlerCaller

```
    class TPrinterHandlerCaller : protected MRemoteCaller {
    public:
        TPrinterHandlerCaller(TSenderTransport*);
        virtual-TPrinterHandlerCaller( );
        // Remote requests
        // These are called by TPrinterModel's command handlers
        virtual TPrintJobQueue*     CreateJobIterator( );
        virtual void                AbortAllJobs( );
        virtual void                DeferAllJobs( );
        virtual void                UndeferAllJobs( );
        virtual void                DeferAllJobsUntil( );
        virtual void                AddJob(TPrintJobSurrogate&);
        virtual void                RemoveJob(const
TPrintJobSurrogate&);
        virtual void                PauseJob(const
TPrintJobSurrogate&);
        virtual void                DeferJobRequest(const
TPrintJobSurrogate&);
        virtual void                UndeferJobRequest(const
TPrintJobSurrogate&);
        virtual void                GetStatus(TText&);
        // . . . . .
    MRemoteCallerDeclarationsMacro(TPrinterHandlerCaller);
};
```

A TPrinterHandlerCaller is instantiated in the printing task (the task that initiates printing, probably a compound document) by the TPrinterModel. It uses a transport to send a request to the printer handler task. The transport can be local or remotely located. Thus, the printer handler to be on a remote machine. A reference to an already-registered service (like a network printer) required by the transport is known to the printer that the document is being printed on. When the printer handler is remote, TServiceReference is obtained from the network.

TPrinterHandlerCaller's methods are called by the printer model's commands which are called by the document framework in response to user actions.

TPrinterImagingTask

```
class TPrinterImagingTask : public TTaskProgram {
    public:
        TPrinterImagingTask(TIPCExchange*);
        virtual     ~TPrinterImagingTask( );
        // TTaskProgram override
        virtual void     Run( );
        // Support methods to handle different types of messages
from the
        // Printer Handler.
        // The messages that this task will receive are:
        // AbortJob
        // PauseJob
        // GetStatus
        // ProcessJob
        // etc.
        // . . . . . .
};
```

TPrinterImagingTask, which is created by the printer handler, performs the task of imaging print jobs and supplying progress information for the same. The constructor receives a TIPCExchange that the imaging task uses to communicate with the printer handler. As far as the communication between the printer handler server and the imaging task is concerned, there are two possibilities. One is to use the exchange to receive messages and dispatch them based on the message id that the printer handler attaches to the header. Another way to do Inter-Process Communication (IPC) is to use wait groups to handle the dispatching automatically when you provide message handlers for each type of message. The second method makes the implementation more structured (avoids a switch statement) but involves writing more code.

ProcessJob gets a TPrintJobSurrogate as a parameter. Using the TPrintJobSurrogate, the imaging task gets to the print job. A print job has a reference to the printer's persistent data (a TDiskDictionary) that keeps the spooled image of the document, a reference to the printer that the job was targeted to, etc. The printer reference (lets call it TPrinterIdentity) is actually a reference to the TPrinterModel's data. Using this data the imaging task can get to the TPrintDevice subclass for the printer. The imaging task gets the spool stream and the job description (TPrintJobDescription) out of the job's persistent data and asks the print device to process it.

TPrintDevice

```
class TPrintDevice : public MCollectible {
    public
        virtual ~TPrintDevice( );
// Don't override these: override the HandleXXX methods below.
    virtual void RenderPrintRun(const TPrintRun&,const
TPrintJobDescription&.
                const TPrinterIdentity&);
        virtual void RenderPage(const TGrafRun& grafRun, const
TPageDescription&,
// MCollectible support
        virtual TStream& operator<<=(TStream& fromwhere);
        virtual TStream&operator>>=(TStream& towhere) const;
        virtual Boolean IsEqual(const MCollectible *) const;
    protected;
```

-continued

TPrintDevice

```
        TPrintDevice& operator=(const TPrintDevice&);
        // You can use these in the HandleXXX methods below to
get current
        // page/job information.
        virtual TPrintRun* GetPrintRun( );
        virtual const TPrintJobDescription*
GetPrintJobDescription( );
        virtual TGrafRun* GetGrafRun( );
        virtual TPageDescription* GetPageDescription( );
        // The following methods are called as a result of
RenderPrintRun( ).
        // Don't call these directly: call RenderPrintRun( ).
        // You may override these. If you override
Begin/EndPrintRun, then
        // be sure to call these base class methods as the first
thing
        // in your override implementations.
        virtual void     HandleBeginPrintRun( );
        virtual void     HandleRenderPrintRun( );
            // Default implementation goes through the
printrun in
            // forward order and calls RenderPage for each
page.
        virtual void     HandleEndPrintRun( );
        // The following methods are called as a result of
RenderPage( ).
        // Don't call these directly: call RenderPage( ).
        virtual void     HandleBeginPage( );
        virtual void     HandleRenderPage( ) = 0;
        // You must override this to convert the page to the
printer imaging model.
        virtual void     HandleEndPage( );
    protected:
        TPrintDevice( );
};
```

TPrintDevice converts a document to the printer imaging model. It provides an abstract interface to access page and job information and to process the job (a Print Run) and each page. Subclasses implement HandleRenderPage method to convert the page data to the printer imaging model. TPrintDevice is one of the objects that will be included in the personality document that the developer can edit or subclass. Therefore, it is possible for the developer to supply an implementation for converting the document to the printer imaging model. TPrintDevice is resurrected from the printer personality by the imaging task. RenderPrintRun is called with a TPrintRun, TPrintJobDescription, and a TPrinterIdentity. RenderPrintRun calls HandleBeginPrintRun. HandleRenderPrintRun, and HandleEndPrintRun. The reason for providing the begin and end methods is so that the subclasses can send some global commands to the printer before and after the document is processed. The default implementation of HandlePrintRun goes through the printrun in forward order and calls RenderPage for each page. Subclasses can override this to "play" the document in any random order they like. RenderPage calls HandleBeginPage, HandleRenderPage and HandleEndPage. Again, the reason for providing the begin and end methods is so subclasses can send page level global commands to the printer.

The TPrintJobDescription parameter, passed in the constructor, gives the user selected print time options. The print device maps the user's choice to what is actually available on the printer. It uses the printer's configuration kept in the printer's persistent store (the printer identity object can be used to get to the persistent store.).

TPrinterConfiguration

```
class TPrinterConfiguration : public MCollectible {
    public:
        virtual-TPrinterConfiguration( );
        // for static state of the printer
        // virtual TPageDescription&
    GetDefaultPageDescription( ) const = 0;
        // subclasses can return static or current state of the
printer from    // following methods.
        virtual TPageList&          GetPageList( ) const =
0;
        virtual TMediaList&         GedMediaList( ) const =
0;
        virtual TResolutionList&    GetResolutionList( )
const = 0;
        virtual TRGBColor           GetEngineColor( ) const =
0;
        // for dynamic state of the printer
        virtual TPageDescription&
    GetCurrentPageDesecription( ) const = 0;
        virtual void                SetPageList(TPageList&) =
0;
        virtual void
    setMediaList(TMediaList&) = 0;
        virtual void
    SetResolution(TResolution&) = 0;
        virtual TStream&      operator<<=(TStream& fromwhere);
        virtual TStream&      operator>>=(TStream& towhere)
const;
        virtual Boolean       IsEqual (const MCollectible*) const;
        virtual long              Hash( ) const:
    protected:
        TPrinterConfiguration( );
        TPrinterConfiguration&operator=(const
TPrinterConfiguration&);
};
```

TPrinterConfiguration is an abstract base class for a printer's state. It is part of the printer's persistent data kept current by the printer handler. Subclasses can store the actual configuration data in a file of their choice (e.g. dictionary, flat stream, etc.). For example, TPSPrinterConfiguration will use PPD files converted to a disk dictionary to keep configuration data. TPrinterConfiguration defines a protocol that provides for setting and getting configuration items such as page sizes, media, resolution(s), etc. When a printer is first available for use, its persistent store (a TModelStore) is created and TPrinterConfiguration is asked to write itself into the store. This becomes the printer's initial state which is updated when a print job is sent to it.

The lists returned by getters (TPageList, TMediaList, etc.) are implemented using C++ templates. As mentioned earlier, each type of printer has a subclass of TPrinterConfiguration that returns the printer's static configuration. This is streamed into the personality document which is given to the developer of that type of printer. The developer typically will edit the configuration instance (that is, the fields of the particular TPrinterConfiguration class) to include the printer's data.

TPrintJobDescription

```
class TPrintJobDescription : public MCollectible
{
    public:
        MCollectibleDeclarationsMacro(TPrintJobDescription);
    public:
    TPrintJobDescription(TPrinterIdentity&);
```

-continued

TPrintJobDescription

```
                TPrintJobDescription(const
                TPrintJobDescription&);
        virtual ~TPrintJobDescription( );
    typedef enum EBannerPage { eNoBanner, eBriefBanner,
eWholeBanner
};
        // -------------------------        //
Description: These member functions are pretty much self
explanatory
        //                  except for notes as added.
        // Rewires          :
        // Modifies         : The job's state is altered to reflect the
requested
        //              operation.
        // Effects          :
        // Raises           :
        // Override         : All subclasses must override all virtual
functions.
        // ---------------------------                    virtual
void        SetCopies(unsigned long);
        virtual unsigned long       GetCopies( ) const;
        virtual unsigned long       GetPageCount( ) const;
        virtual void                SetPageCount(unsigned long);
        virtual void                SetCoverPage(EBannerPage);
        virtual EBannerPage         GetCoverPage( ) const;
        virtual void                SetEndPage(EBannerPage);
        virtual EBannerPage         GetEndPage( ) const;
        // ----------------------------                   // Punt
choice specifies what the user wants to do when the page sizes
    // don't match between the document and the printer.
These options
        // are defined in PageDescription.h
        // ----------------------------                   virtual
void            SetJobPuntChoice(EPuntOption choice);
        virtual EPuntOption         GetJobPuntChoice( ) const;
            // Get the printer that this PrintJobDescription
comes from
        virtual void
    GetPrinterIdentity(TPrinterIdentity&) const;
        // User interface. Equivalent to the classic Print Job
dialog.
        virtual void                EditSelf( );
        // MCollectible support
        virtual TStream&            operator<<=(TStream&
fromwhere);
        virtual TStream&            operator>>=(TStream&
towhere) const;
        virtual TPrintJobDescription& operator=(const
TPrintJobDescription&);
        virtual Boolean       operator==(const
TPrintJobDescription&) const;
        virtual Boolean             IsEqual(const MCollectible*
right) const;
    protected:
            TPrintJobDescription( ); // for Streaming
};
```

TPrintJobDescription is a base class providing protocol for accessing/changing print time options like number of copies, cover page choices, punt options (what to do when there is a mismatch between the document and printer page sizes), etc. Developers can subclass this to add features specific to their device. The default implementation of TPrintJobDescription provides the choice of options common to all printers. The print job description gets streamed with a print job and is used by TPrintDevice (in the printer handler task) to send appropriate commands to the printer that implement the print time options. Each job description knows the printer that it is comes from. As a matter of fact, it is created by the printer model. The printer model gets it out of the printer's personality document. EditSelf is a place holder for a method that might be used to allow users to change job description attributes. This method might be called in response to the system wide print menu command.

User Scenario

A new PostScript printer, ABC Lriter is added to the network that the user wants to print to. Since ABC chose not to subclass any of the personality classes, it simply supplies the PPD (Postscript Printer Description) file with the printer. The TPSPrinterConfiguration can parse a PPD file and convert it into a configuration dictionary. So, the PPD file can be placed somewhere on the computer, and a preferred embodiment handles the rest. The ABC Lriter Iicon is moved from the network browser to the printer in the browser. Behind the scenes, the TPSPrinterServiceAdaptor class (a subclass of TServiceAdaptor), given a TServiceReference in the CreateModel method, talks to the printer to get the product name of the printer and associates the model with the correct PPD file. If the printer is busy, this operation may have to be deferred. Also, if the device specific PPD file is not available. TPSPrinterConfiguration will default to a "standard" PostScript printer configuration.

Printer Sharing

Sharing printers across machines (peer to peer or print servers) is supported by the Printer Handler. Compatibility with existing OS applications, legacy applications is a part of a preferred embodiment. Applications and operating systems that abstract the imaging into graphical data can write translation drivers to convert the data format. This has the benefit of being device independent when entering into the system. An example of this kind of translation is a Windows application, layered above Pink, in which the GDI printing driver would translate the GDI into a compatible format. At this point, the print job would be similar to other print jobs. If the application does the imaging, the device independence is lost. The adapter must present specific printer types to the user for selection. The system accepts the raw printer data and pass it onto the printer. For a uniform interface to print jobs, this job should show up in the printer queues as any other job. Due to the lack of direct device manipulation by the application, the imaged data stream will have to make assumptions about the device and will not be redirectable to other output devices.

For legacy data, the approach will be slightly different. If the data can be converted into a system graphic model, then a TModel data encapsulator should be written to do this conversion. Almost any file format, such as TIFF, Pict, HPG L, Adobe Illustrator and Adobe Acrobat should be easily translatable. More complex files such as EPSF or Raw PostScript files can be encapsulated but would require a PostScript interpreter. To simply print these complex files, the same imaged data interface specified above could be utilized. A print job either contains a spool file or imaged data. This is to prevent the mixing of device dependent and device independent data.

Peer-to-peer printing

The ability to print across machines has usually been accomplished by dedicating a server for this purpose. Now that the operating system can accommodate additional remote processing (due in part to protected address spaces, robustness and computation power), the use of a client machine (peer) as a server for other peers is achievable. To allow this, the printing architecture must permit printer handlers to advertise themselves as a sharable printer and the printer handler must be able to transfer the job to the remote system. The use of a peer as a server clouds the distinction but for our purposes all machines will have the same capabilities. The printing system will not treat systems setup for serving multiple printers differently than a published peer.

Due to the raw data requirement, the printing system must be able to spool both graphics between systems and raw imaged data. The case of graphics is considered remote imaging because the device independent data is converted to device dependent data on the remote system. Conversely, the case of spooling raw data can be thought of as local imaging since you could actually convert the data into an imaging language on the local system before transferring the device dependent data to the remote printing system. This capability is only available due to the legacy data requirement. The use of the local imaging model constrains the print job by taking away the device independent nature of the spool file.

Printing Scenarios

The following printing scenarios will help illustrate the use of the shared printer handler. Some of the scenarios are similar but are presented for thoroughness.

Local printing

Figure 9:
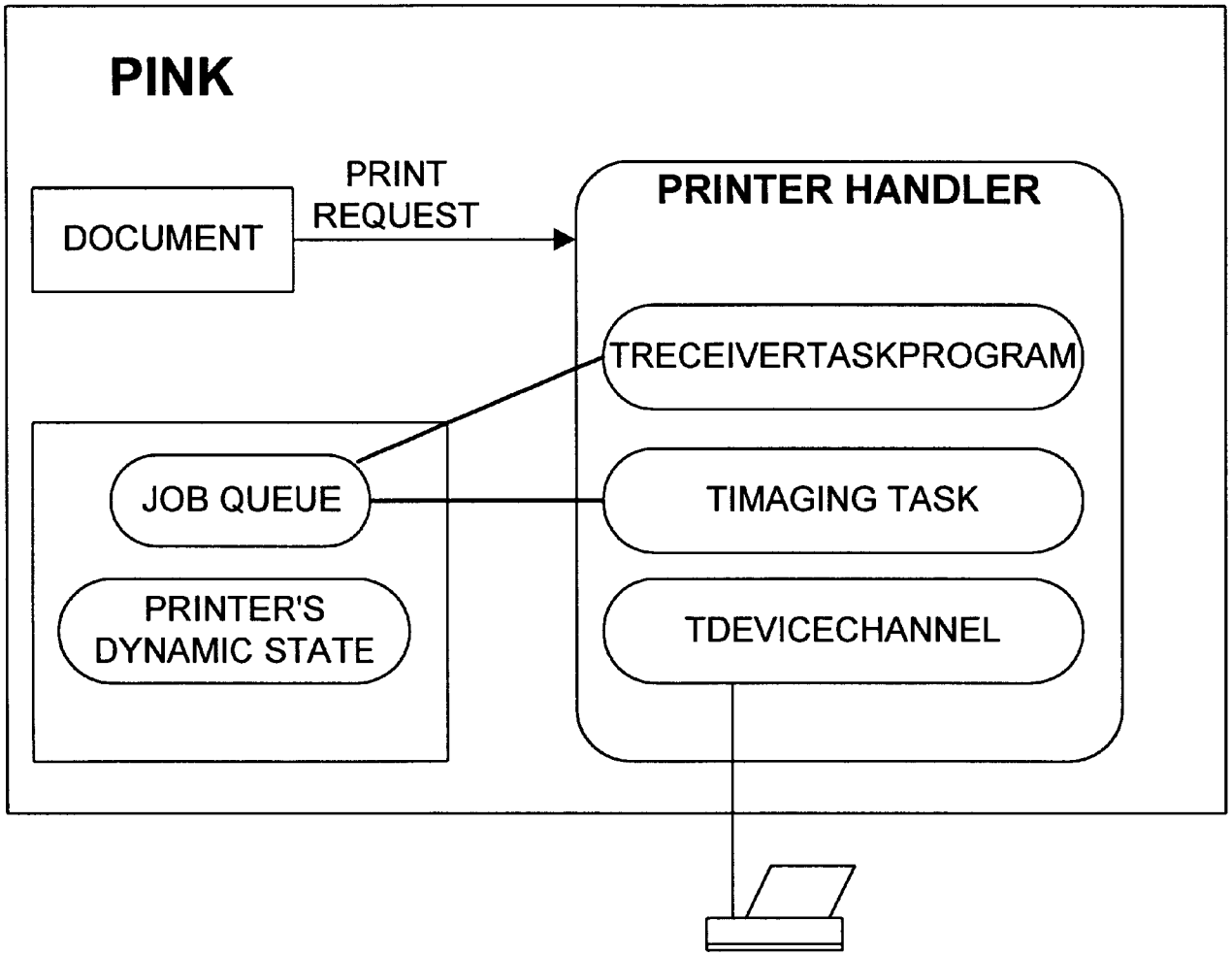
FIG. 9 is a block diagram of local printing in accordance with a preferred embodiment.

FIG. 9 is a block diagram of local printing in accordance with a preferred embodiment. Although local printing does not involve printer sharing, it is useful to consider this as a base model for future discussion. To print to a local printer, the document makes a print request through Tprinter::AddJob( ). This translates into a TPrinterHandlerCaller which is a subclassed MRemoteCaller. The corresponding TPrinterHandler (subclassed from MRemoteDispatcher) will accept the print job and enqueue the job for printing. The Printer Handler will schedule the job through the TImagingTask and the TPrintDeviceChannel. The corresponding TPrintDeviceChannel provides the communication (imaged data transfer, command and status) to the local printer. If the data is legacy imaged data, the TImagingTask does not have to translate the spool file but instead passes it on to the TPrintDeviceChannel without interpretation (ie., it literally dumps the bytes).

Remote imaging

Figure 10:
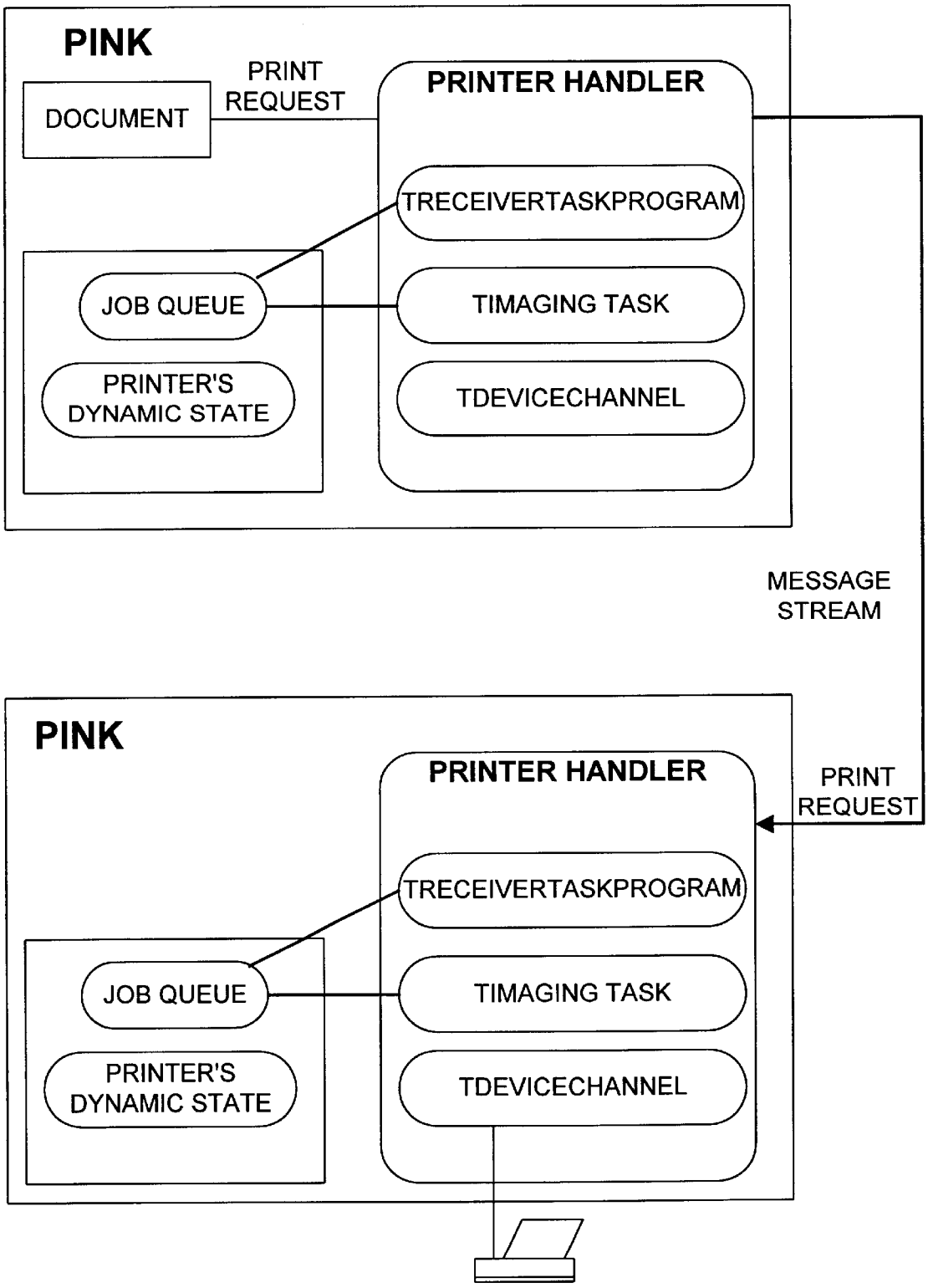
FIG. 10 is a block diagram of remote imaging in accordance with a preferred embodiment.

Remote imaging consists of the local application connecting with a local Printer Handler which spools the graphics commands onto the local system. The Printer Handler connects to a remote system through the same TRemoteCaller/TRemoteDispatcher mechanism as the local print jobs. The remote Printer Handler then routes the spool job through the imaging task and out to the printer via a TPrintDeviceChannel. By routing the job through the remote Printer Handler, the print job will be prioritized in the remote queue. FIG. 10 is a block diagram of remote imaging in accordance with a preferred embodiment.

Local imaging

Figure 11:
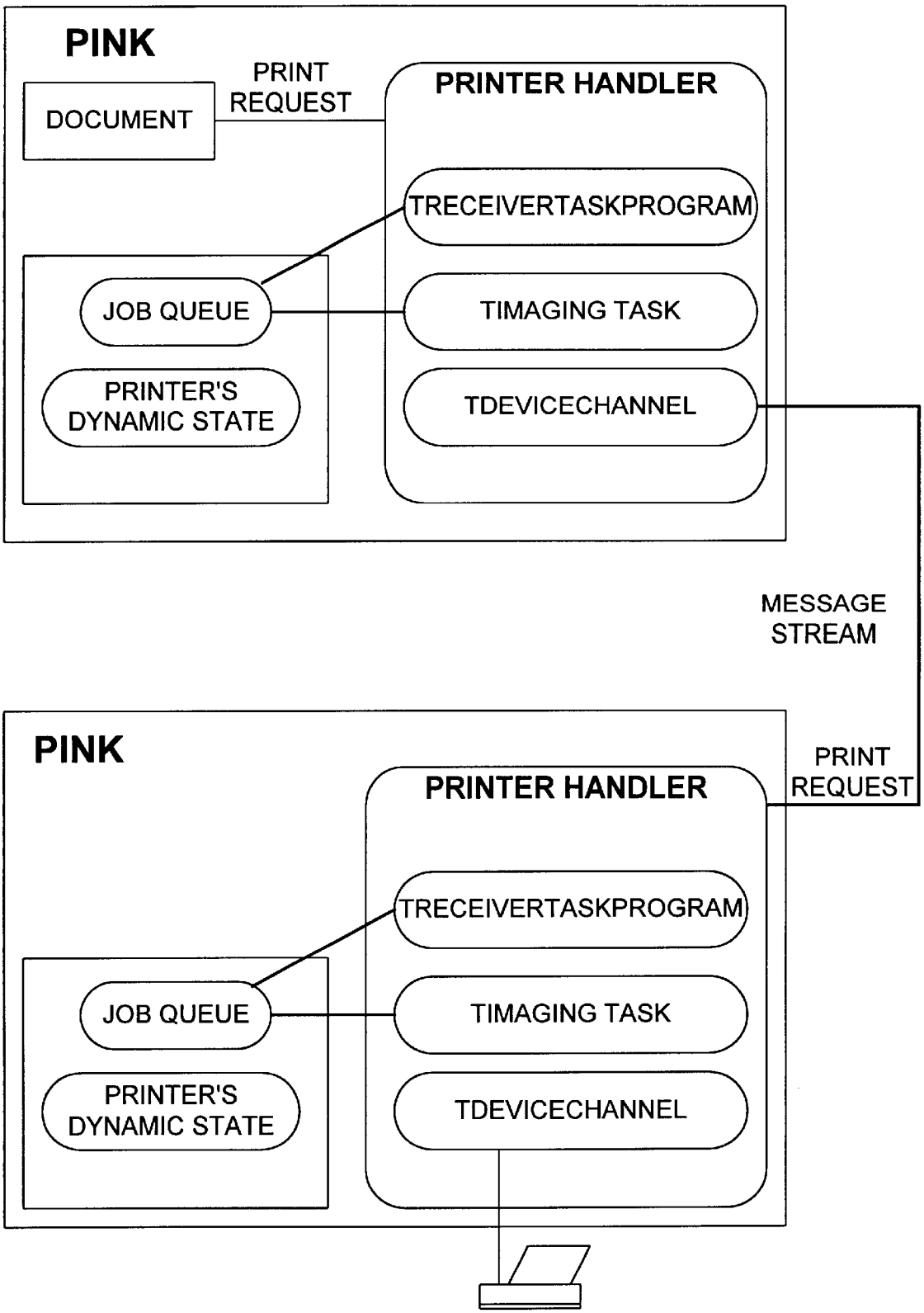
FIG. 11 is a block diagram of local imaging in accordance with a preferred embodiment.

In a local imaging scenario, the application spools the graphics to the local disk but instead of sending the spool file to a remote system, the graphics are translated into an imaging language (like PostScript) by the local imaging task. The local Printer Handler then sends the imaged data to the remote system (the remote Printer Handler) for spooling into its spool queue. The job is then sent out to the printer via a local TPrintDeviceChannel. The ability to spool raw imaged data is utilized for this situation but should be avoided since the device independence is lost prior to being received by the remote system. The use of device queries or bi-directional communication with the device is not possible across remote systems. FIG. 11 is a block diagram of local imaging in accordance with a preferred embodiment.

Local imaging to networked printer

Figure 12:
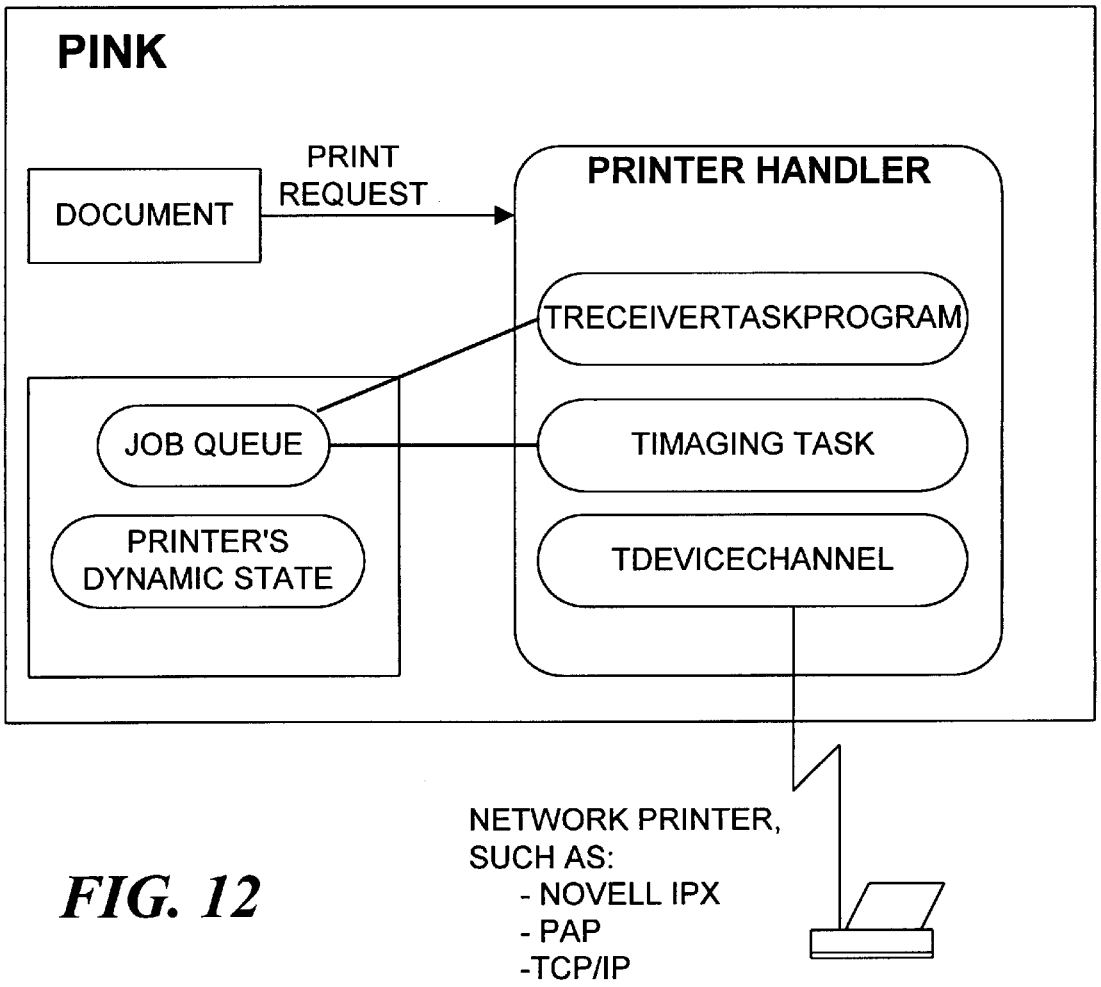
FIG. 12 is a block diagram of local imaging to a networked printer.

Networked printers are basically the same as a local printer except that the communications channel must use a specific network protocol. This scenario can be used for printers using protocols based on NPA (Network Printing Architecture), TCP/IP, PAP protocol, and Novell IPX based print servers. The TPrintDeviceChannel will map the printer protocol into the TImagingTask interface for devices. FIG. 12 is a block diagram of local imaging to a networked printer.

TPrinterHandler Interface Changes

A TPrinterItandler will register itself as a TServiceAdaptor and provide a protocol interface (using Message Streams. Since the communication is similar whether the TPrinterHandler is on one machine or multiple machines, it is not necessary to implement a wrapper class to handle the IPC between machines.

TPrintlobHandle Interface

To facilitate printing raw data from a TModel, the TPrintJobHandle interface will include a method to set the type of the job (SetJobType).

TPrintDeviceChannel Interface

The TPrintDeviceChannel interface will be used to provide a common interface between the imaging task and the physical printer. The TPrintDeviceChannel will implement different communications protocols for the printing services, example implementations could be for direct connect printers (serial or parallel) or networked devices (such as PAP, Novell, and TCP/IP). For some hardware or special purposes, the TPrinterHandler can integrate the communications portion without using a TPrintDeviceChannel but typical printer architecture's will use TPrintDeviceChannel.

In summary, the printer handler interface provides a set of query, data transfer and control methods. The queries consist of a Lookup (for device identification), IsBidirectional (in order to provide optimized imaging), and GetStatus (for printer status). For data transfer, the Connect and Disconnect methods will be used to bracket connections prior to using SendData and GetData. The control methods include Abort (cancel the job), Pause (pause the job) and Flush (to clear out the data channel). To allow for parallel processing between the imaging task and the TPrintDeviceChannel, a GetStream method provides multiple streams to the imaging task.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer system for controlling a print device to generate a printed output, the computer system comprising:

(a) an application program for generating printable information;

(b) a storage device;

(c) a processor for executing the application program, for storing the printable information in the storage device and for retrieving the printable information from the storage device;

(d) an operating system stored in the storage device and cooperating with the processor for controlling the print device, the operating system comprising:

(1) a printing interface for formatting and paginating the printable information in response to commands generated by the application program;

(2) a printer handler for receiving formatted printable information from the printing interface, for converting the formatted printable information to a native imaging model of the print device, for modifying the printable information to include predetermined printer commands to control the print device and for providing an output data stream which includes the printable information modified to include the predetermined printer commands; and (3) means for transmitting the formatted, printable information from the printing interface to the printer handler; and (e) communication means for receiving the output data stream from the printer handler and for transmitting the output data stream including the modified printable information to the print device.

2. A computer system as recited in claim 1, wherein:

the communication means converts the modified printable information data into electrical signals that are sent to the print device; and the printer handler includes a plurality of query methods a plurality of data transfer methods and a plurality of control methods and wherein at least one of the plurality of query methods is a method for querying the print device for status information.

3. A computer system as recited in claim 1, wherein the printing interface generates a document folio which includes textual and graphics data which has been formatted and arranged in a manner specified by the application program; and wherein the computer system further includes a print channel object created to transport the document folio to the print device, wherein the application program identifies the printable information with a print job description and a printer identification which the print channel object uses to transmit the printable information to the print device.

4. A computer system as recited in claim 3, further comprising:

a spooler for receiving printable information from the print channel object;

an intermediate storage location, coupled to the spooler, wherein the spooler stores the printable information received from the print channel object in the intermediate storage location in a predetermined order; and means for notifying the printer handler that printable information is stored in the intermediate storage location.

5. A computer system as recited in claim 4, wherein the printer handler further comprises:

a despooler for retrieving the printable information from the intermediate storage location and forming a data stream; and an imaging engine, coupled to the despooler for receiving the data stream, the imaging engine converting the data stream fed thereto into command signals for driving the print device to provide the printed output.

6. A computer system as recited in claim 1, including menu means for initiating a print operation.

7. A computer system as recited in claim 1, including means for connecting the printer handler to a remote computer system having a second print device.

8. A method for controlling a computer to generate a printed output, the method comprising the steps of:

(a) generating printable information comprising at least one of textual data and graphics data using an application program running in a local computer;

(b) formatting the printable information in response to commands generated by the application program;

(c) paginating the printable information in response to commands generated by the application program;

(d) generating a document folio which includes the printable information which has been formatted and paginated by the application program;

(e) spooling the printable information onto a storage device of the local computer;

(f) connecting the local computer to a remote computer system having a print device coupled there to;

(g) converting the printable information to a native imaging model of the print device coupled to the remote computer system;

(h) modifying the printable information to include predetermined printer commands to control the print device of the remote computer system; and (i) transmitting the formatted, modified printable information to the print device of the remote computer system for printing.

9. A method as recited in claim 8, including the step of querying the print device of the remote computer system for status information.

10. A method as recited in claim 8, wherein step (i) includes the steps of:

(i1) storing a graphic description of the documentation folio on the storage device as a print job;

(i2) transmitting a message to a printer handler that there is a print job for the print handler to process;

(i3) locating the print job via the printer handler;

(i4) retrieving the print job from the storage device;

(i5) converting the print job to a native imaging model of the print device; and (i6) sending the converted print job to the print device.

11. A method as recited in claim 10, further comprising the step of:

(j) prioritizing the print job in a print queue of the remote computer system.

12. A method as recited in claim 10, further comprising the steps of:

(k) converting the print job retrieved from the storage device into command signals;

(l) providing the command signals to the print device; and (m) using the command signals to drive printing elements of the print device and to produce a printed document.

13. A method as recited in claim 12 wherein after a particular print job is completed, the method further includes the step of:

(n) deleting the print job stored in the storage device.

14. A method as recited in claim 8, including the step of:

(p) reporting status information during a print operation.

15. A method as recited in claim 14, including the step of:

(q) reporting status information when a new page is encountered.

16. A method of transmitting a document to a printer under control of an application program, the method comprising the steps of:

(a) generating a document folio containing textual and graphic data to be printed, the data being formatted and arranged in a predetermined manner specified by the application program;

(b) generating a print job description and a printer identification code for the printer;

(c) instantiating a print channel object using the printer identification code to transport the document folio to the printer;

(d) providing the document folio and the print job description to the printer channel object as a print job;

(e) transporting the print job to the printer via the print channel object; and (f) removing the document folio from the print job and using the information therein to control the printer to print the textual and graphic data therein.

17. The method of claim 16 wherein the step (e) includes the steps of:

(e.1) transmitting the print job to a spooler program;

(e.2) receiving the print job in the spooler program;

(e.3) storing the print job in an intermediate storage location; and (e.4) notifying a print server via a link that the print job is stored in the intermediate storage location.

18. The method of claim 17 wherein, step (e) further comprises the steps of:

(e.5) notifying a printer handler via the print server that the textual and graphic data has been stored in the intermediate storage location;

(e.6) retrieving the textual and graphic data from the intermediate storage location; and (e.7) providing the textual and graphic data to an imaging engine.

19. The method of claim 18 wherein step (f) further comprises the steps of:

(f.1) converting, via the imaging engine, the textual and graphic data retrieved from the intermediate storage location into command signals;

(f.2) providing the command signals to the printer; and (f.3) driving printing elements of the printer via the command signals to provide a printed document.

20. The method of claim 18 further including the step of:

(g) deleting the textual and graphic data from the intermediate storage location.

*21. A method for enabling printing by a computer having a memory and an operating system, comprising the steps of:*

*(a) providing class libraries for storage in the computer memory from which*

*(1) a printing interface object may be instantiated to cause the conversion of application program output to page-formatted text and graphic data, and*

*(2) a print channel object may be instantiated to cause the transfer of the page formatted data to an appropriate printer; and*

*(b) providing a run-time environment to*

*(1) support the instantiation of the printing interface and print channel objects and*

*(2) selectively cause the transfer by the operating system of the page formatted data to a specific printer.*

*22. The method of claim 21, wherein the transfer causing step (b)(2) further comprises the step of rearranging the page order of the formatted data responsive to a message representing a print job priority.*

*23. The method of claim 22, wherein the rearranging step further comprises the step of selectively reorienting the page formatted data responsive to a message representing a predetermined bookler print format.*

*24. The method of claim 21, wherein the transfer causing step (b)(2) further comprises the step of transferring selected portions of the page formatted data to a specific printer.*

*25. The method of claim 21, wherein the transfer causing step (b)(2) further comprises the step of transferring the page formatted data to a selected one of several specific printers.*

*26. The method of claim 21, wherein the page formatted data includes text and graphics data arranged in a predetermined printer-dependent format.*

*27. The method of claim 21, wherein the application program output includes text and graphics data arranged in a printer-independent format.*

*28. A computer program product for enabling printing by a computer having a memory and an operating system, said computer program product including a computer-useable means for storing therein computer-readable code comprising:*

*program code for providing class libraries for storage in the computer memory from which*

*a printing interface object may be instantiated to cause the conversion of application program output to page-formatted text and graphic data, and*

*a print channel object may be instantiated to cause the transfer of the page formatted data to an appropriate printer; and*

*program code for providing a run-time environment to support the instantiation of the printing interface and print channel objects and*

*selectively cause the transfer by the operating system of the page formatted data to a specific printer.*

*29. The computer program product of claim 28, further comprising program code for rearranging the page order of the formatted data responsive to a message representing a print job priority.*

*30. The computer program product of claim 29, further comprising program code for selectively reorienting the page formatted data responsive to a message representing a predetermined booklet print format.*

*31. The computer program product of claim 28, further comprising program code for transferring selected portions of the page formatted data to a specific printer.*

*32. The computer program product of claim 28, wherein the page formatted data includes text and graphics data arranged in a predetermined printer-independent format.*

*33. The computer program product of claim 28, wherein the application program output includes text and graphics data arranged in a printer-independent format.*

* * * * *